United States Patent
Xu et al.

(10) Patent No.: US 9,721,173 B2
(45) Date of Patent: Aug. 1, 2017

(54) MACHINE LEARNING APPROACH FOR DETECTING MOBILE PHONE USAGE BY A DRIVER

(71) Applicant: Conduent Business Services, LLC, Dallas, TX (US)

(72) Inventors: Beilei Xu, Penfield, NY (US); Robert P. Loce, Webster, NY (US); Thomas F. Wade, Rochester, NY (US); Peter Paul, Penfield, NY (US)

(73) Assignee: Conduent Business Services, LLC, Dallas, TX (US)

( * ) Notice: Subject to any disclaimer, the term of this patent is extended or adjusted under 35 U.S.C. 154(b) by 0 days.

(21) Appl. No.: 14/245,212

(22) Filed: Apr. 4, 2014

(65) Prior Publication Data

US 2015/0286884 A1   Oct. 8, 2015

(51) Int. Cl.
*G06K 9/00*  (2006.01)
*G06K 9/46*  (2006.01)
*G06K 9/62*  (2006.01)

(52) U.S. Cl.
CPC ....... *G06K 9/00845* (2013.01); *G06K 9/4676* (2013.01); *G06K 9/6234* (2013.01)

(58) Field of Classification Search
None
See application file for complete search history.

(56) References Cited

U.S. PATENT DOCUMENTS

| | | | | |
|---|---|---|---|---|
| 6,914,541 B1* | 7/2005 | Zierden | ................... | G08G 1/052 340/933 |
| 6,970,102 B2* | 11/2005 | Ciolli | ..................... | G08G 1/052 340/425.5 |
| 7,504,965 B1* | 3/2009 | Windover | ............ | G08G 1/0175 340/933 |
| 7,786,897 B2* | 8/2010 | Alves | ................... | G08G 1/0175 340/905 |
| 8,103,402 B2* | 1/2012 | Kozlay | .................. | G06Q 10/06 701/29.3 |
| 2003/0137408 A1* | 7/2003 | Breiner | .................... | B60Q 1/50 340/425.5 |
| 2005/0151671 A1* | 7/2005 | Bortolotto | .............. | G08G 1/054 340/936 |
| 2006/0055561 A1* | 3/2006 | Kamali | .................. | G08G 1/052 340/936 |

(Continued)

OTHER PUBLICATIONS

"High Occupancy Vehicle Detection" by Perez-Jimenez et al.*
(Continued)

*Primary Examiner* — Tsung-Yin Tsai
(74) *Attorney, Agent, or Firm* — Fay Sharpe LLP

(57) ABSTRACT

A system and method for detecting electronic device use by a driver of a vehicle including acquiring an image including a vehicle from an associated image capture device positioned to view oncoming traffic, locating a windshield region of the vehicle in the captured image, processing pixels of the windshield region of the image for computing a feature vector describing the windshield region of the vehicle, applying the feature vector to a classifier for classifying the image into respective classes including at least classes for candidate electronic device use and candidate electronic device non-use, and outputting the classification.

17 Claims, 4 Drawing Sheets

(56) References Cited

U.S. PATENT DOCUMENTS

| | | | | |
|---|---|---|---|---|
| 2008/0036623 A1* | 2/2008 | Rosen | .................. | H04M 3/2281 |
| | | | | 340/936 |
| 2010/0035632 A1* | 2/2010 | Catten | ................... | H04W 24/08 |
| | | | | 455/456.1 |
| 2010/0130182 A1* | 5/2010 | Rosen | ................ | G06K 9/00785 |
| | | | | 455/414.1 |
| 2010/0271497 A1* | 10/2010 | Monsive, Jr. | ............ | G08G 1/04 |
| | | | | 348/211.99 |
| 2010/0323657 A1* | 12/2010 | Barnard | .................. | H04W 4/02 |
| | | | | 455/404.1 |
| 2012/0040650 A1* | 2/2012 | Rosen | ................. | H04M 3/2218 |
| | | | | 455/414.1 |
| 2012/0212593 A1* | 8/2012 | Na'aman | ............. | G09B 21/006 |
| | | | | 348/62 |
| 2013/0070957 A1* | 3/2013 | Zhang | ................ | G06K 9/00362 |
| | | | | 382/100 |
| 2013/0148845 A1* | 6/2013 | Maeda | ................. | G01S 17/023 |
| | | | | 382/103 |
| 2013/0150004 A1* | 6/2013 | Rosen | ..................... | H04W 8/22 |
| | | | | 455/414.1 |
| 2015/0054639 A1* | 2/2015 | Rosen | ................ | G06K 9/00785 |
| | | | | 340/439 |
| 2015/0286885 A1* | 10/2015 | Bulan | ................. | G06K 9/4642 |
| | | | | 382/104 |

OTHER PUBLICATIONS

Nilsson et al "Face Detection Using Local SMQT Feature and Split Up Snow Classifier".*
U.S. Appl. No. 13/527,228, filed Jun. 19, 2012.

\* cited by examiner

MACHINE LEARNING APPROACH FOR DETECTING MOBILE PHONE USAGE BY A DRIVER

BACKGROUND

The present disclosure relates to an image-based method and system for detecting vehicle occupant activities. The disclosure finds application in detecting certain activities such as electronic device use by a driver of a vehicle. However, it is to be appreciated that the present exemplary embodiments are also amendable to other like applications.

Mobile phone use (talking/texting) while driving is common, but widely considered dangerous. According to a recent government study of distracted driving, 995 out of 5474 (18%) who were killed by distracted drivers in 2009 were considered to be killed by drivers distracted by mobile phones. Due to the high number of accidents that are related to mobile phone use while driving, many jurisdictions, including many U.S. states, have made the use of a mobile phone and/or other devices while driving illegal. For example, at least ten U.S. states, Washington D.C., Puerto Rico, Guam and the U.S. Virgin Islands prohibit all drivers from using hand-held mobile phones while driving.

Many of the enacted laws are primary enforcement which means an officer may cite a driver for using a hand-held mobile phone without any other traffic offense taking place. However, to enforce the rules, current practice requires dispatching law enforcement officers at the road side to visually examine oncoming cars or having human operators manually examine image/video records to identify violators. Both of the processes are expensive, difficult, and ultimately ineffective. Therefore, there is a need for an automatic or semi-automatic solution.

A variety of approaches have been developed for detecting mobile phone use. In one approach, a sensor is installed in a vehicle (with an adjustable range) to detect cell phone usage within that range. Another approach uses a combination of bluetooth signals and vehicle speakers. Both of these approaches require special sensing devices besides a camera.

Yet another approach uses multi-spectral images or videos of individuals and analyzes the data to identify skin pixels and cell phone pixels within the image or the video based on a set of material characteristics. This approach requires special multispectral cameras (non-silicon based, e.g. indium gallium arsenide) and illuminators in the wavelength range of 1000 nm~1700 nm, which are expensive (e.g., the camera can cost up to $50,000) compared to conventional silicon-based cameras of lower wavelength range (<1000 nm).

Past approaches that focus on object recognition by searching for objects (e.g., mobile phone) based on image content assumptions have not obtained a high level of accuracy. This approach is based on the assumption that different objects within the image, such as faces, seats, seat belts, and electronic devices are visible to the camera. Therefore, parts of the image are analyzed to determine a location of the objects and appearance characteristics, such as color, size, texture, and shape, etc., of the objects. In one example, the appearance characteristic can include spectral features, which can be extracted for detecting pixels belonging to the skin of an occupant. The extraction of the appearance characteristics can be performed via a feature representation of the object. The objects in the image that have characteristics that match a reference object (e.g. mobile phone), are associated as being the same as the reference object. In other words, the object is labeled as being an occupant or a seat or a mobile phone, etc.

One problem associated with conventional object detection is that variations in the captured image can result in incorrect classifications. Moreover, when the particular object is fully or partially obscured, conventional object detection will most likely fail. For example, the object recognition approach may incorrectly classify an image as having a cell phone when a driver is holding another object, such as box of cigarettes. In this instance, the appearance characteristics that are extracted from the image match those of a mobile phone. In another variation in which an occupant is holding a phone to their ear, the object recognition approach may incorrectly classify an image as not having a cell phone, particularly when the mobile phone is partially or wholly obscured from the camera.

Accordingly, there is a need for an improved and more accurate automatic or semi-automatic detection of occupant activities that does not require special equipment or sensors. A system and a method are needed that classify an entire windshield and/or cabin region instead of searching for specific objects situated inside parts of the image and using appearance and spectral features. More specifically, there is needed an approach that makes no assumptions about the content of images in advance of the process.

INCORPORATION BY REFERENCE

The following reference, the disclosure of which is incorporated herein in its entirety by reference is mentioned:

U.S. application Ser. No. 13/527,228, filed Jun. 19, 2012.

BRIEF DESCRIPTION

The method and system set forth in the present disclosure uses images and computer vision techniques to classify a region as including or not including an electronic device. As described below, aspects of the present disclosure can be incorporated within current transportation imaging systems, does not require (but may utilize) a multispectral camera, is not foiled by new "California glass," and has a high level of accuracy.

In accordance with one aspect, a method for detecting electronic device use by a driver of a vehicle comprises acquiring an image including a vehicle from an associated image capture device positioned to view oncoming traffic, locating a windshield region of the vehicle in the captured image, processing pixels of the windshield region of the image for computing a feature vector describing the windshield region of the vehicle, applying the feature vector to a classifier for classifying the image into respective classes including at least classes for candidate electronic device use and candidate electronic device non-use, and outputting the classification.

The method can further comprise, after locating a windshield region of the vehicle in the captured image, extracting the windshield region from the image. The method can also include defining a passenger side and a driver side within the windshield region, and extracting the driver side of the windshield region from the windshield region. The processing the image can be performed by a process selected from a group consisting of: a Successive Mean Quantization Transform (SMQT); a Scale-Invariant Feature Transform (SIFT), a Histogram of Gradients (HOG), a Bag-of-Visual-Words Representation, a Fisher Vector (FV) Representation, and a combination of the above. The method can further include, before acquiring the image, training a classifier using at least a first sample image including a driver holding an electronic device and at least a second sample image including a driver not holding an electronic device. The method can further comprise, in response to the vehicle being classified as a candidate electronic device user, performing further processing on the image for determining whether the vehicle is a violator or non-violator. The further processing on the image can include detecting a unique vehicle identifier associated with the vehicle in the associated image, and comparing the unique vehicle identifier to a list of authorized vehicle identifiers to determine whether the vehicle is a violator or non-violator. The outputting can further include providing notice of a candidate violator to an associated user device for further review.

In accordance with another aspect, a system configured to perform image analysis for detecting electronic device use by a driver of a vehicle comprises an image capture device operably connected to a data processing device that captures an image of a target vehicle, and a processor-usable medium embodying computer code, said processor-usable medium being coupled to said data processing device, said computer program code comprising instructions executable by said processor and configured for: locating a windshield region of the vehicle in the captured image, processing pixels of the windshield region of the image for computing a feature vector describing the windshield region of the vehicle, applying the feature vector to a classifier for classifying the image into respective classes including at least classes for candidate electronic device use and candidate electronic device non-use, and outputting the classification. The computer program code can be further configured for, after locating a windshield region of the vehicle in the captured image, extracting the windshield region from the image. The computer program code can be further configured for defining a passenger side and a driver side within the windshield region, and extracting the driver side of the windshield region from the windshield region. Processing the image is performed by a process selected from a group consisting of: a Successive Mean Quantization Transform (SMQT), a Scale-Invariant Feature Transform (SIFT), a Histogram of Gradients (HOG), a Bag-of-Visual-Words Representation, a Fisher Vector (FV) Representation, and a combination of the above. The computer program code can be further configured for, prior to acquiring the image with the image capture device, training a classifier using at least a first sample image including a driver holding an electronic device and at least a second sample image including a driver not holding an electronic device. The computer program code can be further configured for, in response to the vehicle being classified as a candidate electronic device user, performing further processing on the image for determining whether the vehicle is a violator or non-violator. The further processing on the image can include detecting a unique vehicle identifier associated with the vehicle in the associated image, and comparing the unique vehicle identifier to a list of authorized vehicle identifiers to determine whether the vehicle is a violator or non-violator. The outputting can further include providing notice of a candidate violator to an associated user device for further review.

In accordance with another aspect, a non-transitory computer-usable medium for performing image analysis for detecting electronic device use by a driver of a vehicle said computer-usable medium embodying a computer program code, said computer program code comprises computer executable instructions configured for acquiring an image including a vehicle from an associated image capture device positioned to view oncoming traffic, locating a windshield region of the vehicle in the captured image, processing pixels of the windshield region of the image for computing a feature vector describing the windshield region of the vehicle, applying the feature vector to a classifier for classifying the image into respective classes including at least classes for candidate electronic device use and candidate electronic device non-use, and outputting the classification.

The instructions can further comprise, after locating a windshield region of the vehicle in the captured image, extracting the windshield region from the image. The instructions can further comprise defining a passenger side and a driver side within the windshield region, and extracting the driver side of the windshield region from the windshield region. Processing the image can be performed by a process selected from a group consisting of a Successive Mean Quantization Transform (SMQT), a Scale-Invariant Feature Transform (SIFT), a Histogram of Gradients (HOG), a Bag-of-Visual-Words Representation, a Fisher Vector (FV) Representation, and a combination of the above.

DETAILED DESCRIPTION

The present disclosure sets forth a system and method for detecting a driver's electronic device (e.g., mobile phone) usage. The system and method utilizes machine learning in a two-phase approach, where the first phase is an offline training of a classifier and the second phase applies the trained classifier to classify the driver's electronic device usage/non-usage.

Phase 1—Offline learning, includes:

(1) Acquire positive and negative electronic device usage images within a representative region of interest (ROI) (within a windshield view, around the driver, etc.).

(2) Extract image features from the ROI's to create global feature representations of the respective ROI's.

(3) Train a classifier (e.g., Support Vector Machine (SVM)) using the extracted image features.

Phase 2—Online operation includes:

(1) Acquire an image of a scene of interest using a similar imaging system.

(2) Extract a similar ROI as above, but it is performed algorithmically.

(3) Extract the same type of image features as were used in the training.

(4) Apply the trained classifier, and use it to make a decision on electronic device usage. The candidate violators can be reviewed by a law-enforcement officer or back-office operator, and appropriate action may be taken (issue a ticket or warning, stop the vehicle, etc.).

As will be described, the system analyzes images that are acquired from a camera and then performs the method in two stages. In a first stage, the windshield region (or other region) is located and extracted from the original image. In a second stage, a feature vector is calculated for representing the windshield region. The feature vector is applied to a classifier, which indicates whether the vehicle is a candidate for electronic device use or is a candidate for electronic device non-use. A thresholding parameter can be applied to the image by the classifier for further determining whether the system performs the classification process. In another aspect of the disclosure, the system can be continually retrained while on-line using labeled ground truth from a manual verification of candidate violations.

Figure 1:
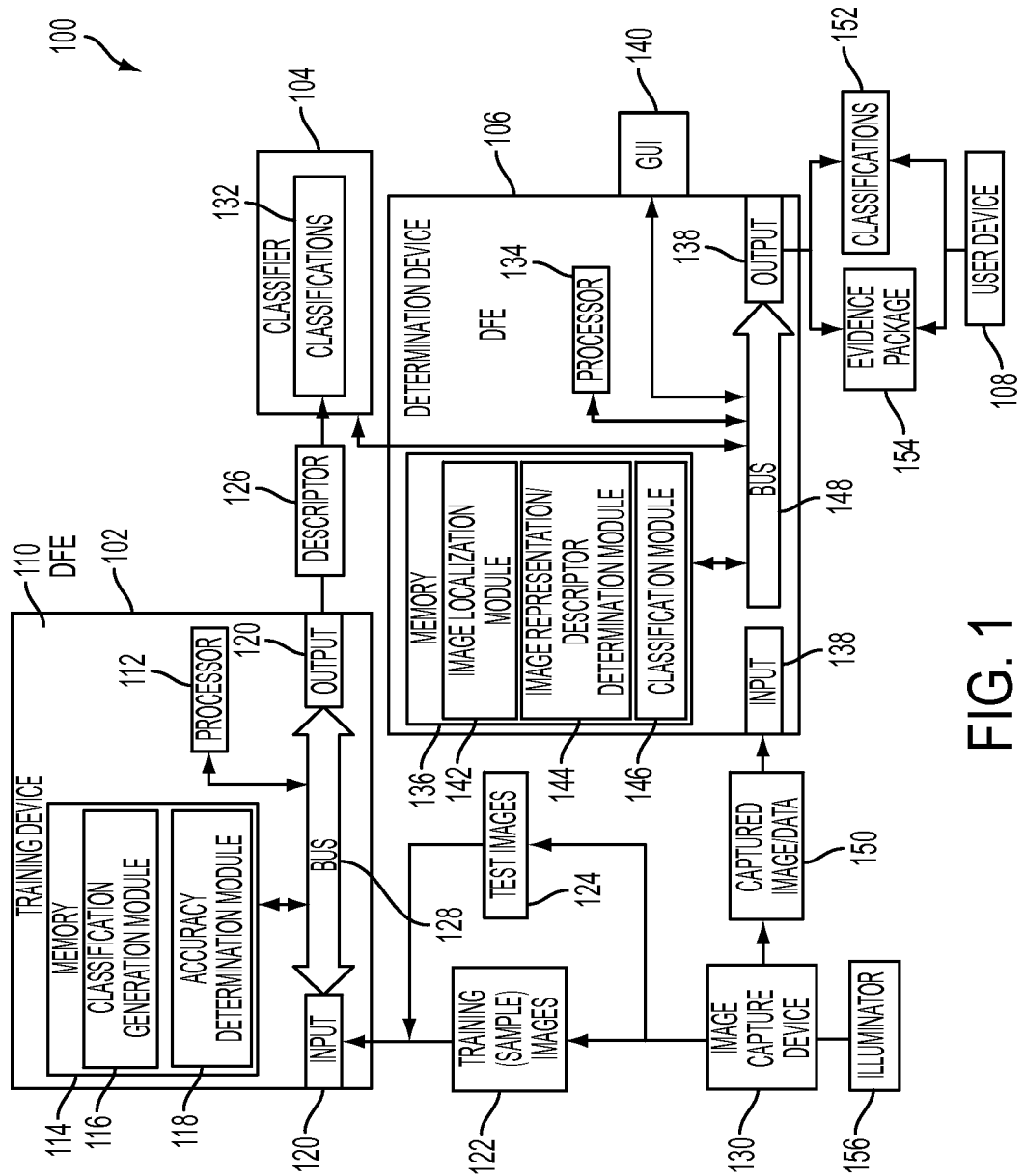
FIG. 1 is a schematic illustration of an exemplary system in accordance with the present disclosure.

Turning now to the drawings, and initially to FIG. 1, a schematic illustration of an exemplary system 100 configured to perform image analysis for detecting electronic device use by a driver of a vehicle in accordance with the present disclosure is illustrated. The system 100 includes a training device 102 (herein also referred to as a 'classifier 102'), a storage device 104, and a violation determination device 106, which may be linked together by communication links, referred to herein as a network. In one embodiment, the system 100 may be in further communication with a user device 108. These components are described in greater detail below.

The training device 102 illustrated in FIG. 1 includes a controller 110 that is part of or associated with the training device 102. The exemplary controller 110 is adapted for controlling a training of the electronic device use detection system 100 by generating at least one descriptor that can be later compared to descriptors computed from captured images. The controller 110 includes a processor 112, which controls the overall operation of the training device 102 by execution of processing instructions, which are stored in memory 114 connected to the processor 112.

The memory 114 may represent any type of tangible computer readable medium such as random access memory (RAM), read only memory (ROM), magnetic disk or tape, optical disk, flash memory, or holographic memory. In one embodiment, the memory 114 comprises a combination of random access memory and read only memory. The digital processor 112 can be variously embodied, such as by a single-core processor, a dual-core processor (or more generally by a multiple-core processor), a digital processor and cooperating math coprocessor, a digital controller, or the like. The digital processor 112, in addition to controlling the operation of the training device 102, executes instructions stored in memory 114 for performing the parts of the method outlined herein that is performed at the system 100. In some embodiments, the processor 112 and memory 114 may be combined in a single chip.

The training device 102 may be embodied in a networked device, although it is also contemplated that the training device 102 may be located elsewhere on a network to which the system 100 is connected, such as on a server, networked computer, or the like, or distributed throughout the network or otherwise accessible thereto. The classifier can be a Support Vector Machine (SVM), which is trained on a set of labeled windshield images according to the instructions contained in the memory 114. In particular, the memory 114 stores a classification generation module 116, which is adapted to acquire training images with labels, group images with the same label in a set, calculate features using a set of labeled data, and associate a set of features with a select classification, compute a signed distance between the vehicle image kernel transformed representations (i.e., feature vector/descriptor) in the projected feature space and a hyper-plane boundary, compare the unsigned distance to a threshold, and classify the image based on results of the comparison. Embodiments are contemplated wherein these instructions can be stored in one module. In other embodiments, a sparse network of winnow (SNoW) or a neural network can be used in place of or in addition to the SVM. The modules 116, 118 will be later described with reference to the exemplary method.

The software modules as used herein are intended to encompass any collection or set of instructions executable by the training device 102 or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server (not shown) or other location to perform certain functions.

With continued reference to FIG. 1, the training device 102 also includes one or more communication interfaces, such as network interfaces, for communicating with external devices. The communication interfaces 120 may include, for example, a modem, a router, a cable, and and/or Ethernet port, etc. The communication interface 120 is adapted to receive sample (hereinafter "training") images 122 and test images 124 as input and provide at least one descriptor and/or class association (assigned to a set of descriptors) 126 as output. In contemplated embodiments, one communication interface can receive the input and provide the output. The various components of the training device 102 may be all connected by a bus 128.

The training device 102 may include one or more special purpose or general purpose computing devices, such as a server computer or digital front end (DFE), or any other computing device capable of executing instructions for performing the exemplary method.

FIG. 1 further illustrates the training device 102 connected to an image capture device 130 for inputting and/or receiving the training and test images 122, 124 in electronic format. The image capture device 130 may include a camera that is selected to provide the training and test images 122, 124 or it can be an input device adapted to transmit the images captured by a camera to the training device 102. For example, an input device can include a scanner, a computer, or the like. In another embodiment, the image data may be input from any suitable source, such as a workstation, a database, a memory storage device, such as a disk, or the like. The input device can be in communication with the controller 102 containing the processor 112 and memories 114.

The exemplary system 100 further includes a storage device 104 in communication with the training device 102. In a contemplated embodiment, the training device 102 can be in communication with a server (not shown) that includes a processing device and memory, such as storage device 104, or has access to a storage device 104, for storing classes/classifications that can be used by the violation determination device 106. The storage device 104 includes a repository, which stores at least one class 132 (and/or its associated descriptor) provided by the training device 102.

The violation determination device 106 is in communication with the storage device 104 and the image capture device 130. The determination device 106 is adapted to acquire captured image data 150 from the image capture device 130 positioned to view a lane or other area of interest. In the present embodiment, the image capture device 130 can be the same camera used to capture training and test images, or it can be a different camera. Here, the camera-based imaging system is proposed to capture frontal-view images a vehicle.

The system also includes at least one illuminator 156, which provides illumination that is not obtrusive to the driver but still enables robust capturing despite ambient light conditions. In one contemplated embodiment, a near infrared (NIR) illuminator 156 source is used having a wavelength greater than 750 nm. In another embodiment, a visible light illuminator is stationed to provide illumination without shining into eyes of the driver.

The exemplary determination device 106 includes, for example, a computer or microcomputer. The determination device 106 may be included as part of the image capture device 130 or it may be in communication with the image capture device 130. The determination device 106 includes a processor 134, such as a CPU, and a memory 136 for storing software modules executable on the processor of the CPU and at least one communication interface 138 including hardware and/or software suitable for providing wireless data communication with the storage device 104, the image capture device 130, and a graphical user interface (GUI) 140. The memory 136, processor 134, and communication interface(s) 138 can be similarly configured to memory 114, processor 112, and communication interface 120 of the training device 102. The exemplary software module includes an image localization module 142, which locates a windshield region (or desired side of the windshield region, or other region) of the vehicle in a captured image; an image representation determination module 144, which computes a descriptor of the windshield region for analyzing a cabin region of the vehicle using pixels of the image; and, a classification module 146, which classifies the captured image into a respective class. The various components of the violation determination device 106 may be all connected by a bus 148.

Module 144 applies an automatic detection algorithm to the image to determine whether the vehicle is a candidate offender/violator. Generally, module 144 computes an image representation(s). More specifically, the module 144 computes a descriptor for describing the cabin of the vehicle using pixels of the image. Several embodiments are contemplated for computing a descriptor. One embodiment uses a global approach, which extracts a single descriptor for describing the localized image. A global descriptor is computed from pixel statistics. Another embodiment contemplates a sub-image approach, which extracts local descriptors from small patch regions in the image. A single signature is aggregated from the patches for classification.

In a conventional object recognition approach, parts of the image are searched for objects that can be associated with specific items. The objects are labeled as including, for example, a face, a seat, a seat belt, a phone etc. The labels are then applied to a classifier for determining whether the a driver is using a phone or other electronic device.

However, in the global feature representation approach, the module 144 defines a set of generic features that describe the entire image and not just parts (associated with objects and the location of objects) of the image. More specifically, the module 144 applies an algorithm that provides feature vectors describing the image data. In this manner, the computed feature vectors can be used to classify the image without requiring the use of labels of objects.

In one embodiment, the module 144 is adapted to perform a Successive Mean Quantization Transform (SMQT) approach following the technique understood in the art. Generally, the SMQT process determines a feature vector for each pixel in the image by analyzing a vicinity of the pixel.

More specifically, for each pixel that is analyzed, the pixel is designated as a center pixel in a vicinity/region. An average value (0-255) for the region is determined. This average is set as a threshold value. Then, the value of each pixel in the region (i.e., the center pixel and the surrounding pixels in the region) is compared to the threshold. The pixels are each assigned a binary value based on the comparison. For example, pixels having a value below the threshold may be assigned a "0" value and pixels having a value meeting or exceeding the threshold may be assigned a "1" value. For example, a 9-bit binary number is generated for a 3×3 vicinity of a pixel using the binary values of each pixel in the region. The binary number is converted to a decimal number. This decimal number is a descriptor of the center pixel. The process then generates a feature vector using the decimal numbers for each of the pixels in the image.

In the sub-image descriptor approach, the module 144 first identifies patch regions in the image. The module 144 then extracts descriptors from the patch regions. The patch descriptors are then aggregated into image-level descriptors. Generally, the patch descriptors correspond to low-dimensional feature vectors and the image-level descriptor corresponds to a high-level feature vector.

In another embodiment using the global descriptor approach, the module 144 is adapted to extract local patches and represent them with descriptors, following techniques understood in the art such as the SIFT.

In another embodiment using the global descriptor approach, the module 144 is adapted to perform a Histogram of Gradients (HOG) process following the technique understood in the art. Generally, the HOG approach compiles histograms for localized cells (i.e., spatially connected/overlapped cell blocks/block regions of pixels, e.g., 4×6 pixels) in an image. In one embodiment, the process can generate a histogram of gradient directions (orientations) for pixels in each cell, though other descriptors can be used such as shape, texture, and color, etc. In other words, gradients are determined for each cell and the number of occurrences of gradient orientations is counted and a histogram is formed representing the count for each of the orientations. The combination of histograms (for all cells) is used to form the descriptor the descriptor. More specifically, the descriptor is generated as feature vectors representing the normalized histograms for all block regions.

In one embodiment using the sub-image descriptor approach, the module 144 is adapted to compute a Bag-of-Visual-Words (BOW) representation using a technique that is understood in the art. This technique consists in learning a set of patch prototypes by clustering the set of low-level descriptors such as HOG or SIFT. Given a new image, each of its patch descriptors is assigned to its closest prototype and the image is described by the histogram of the number of occurrences of each prototype.

In another embodiment using the sub-image descriptor approach, the module 144 is adapted to compute a Fisher Vector (FV) Representation using a technique that is understood in the art. This technique consists in learning a probabilistic model of the low-level descriptors using, for instance, a Gaussian Mixture Model (GMM). Given a new image, it is characterized by the gradient of the log-likelihood of the image descriptors on the GMM with respect to the model parameters.

In summary, the sub-image approach extracts multiple local descriptors from the windshield sub-image and then aggregates them into a sub-image-level global descriptor. Furthermore, because the system 100 is modular, it can use other features and types of kernels in the classifier for performing the above-mentioned algorithms. In yet another embodiment, a combination of the above approaches can be used. Computing the descriptor can also extend to multiband systems, where the sets of features from images from different spectral bands can be combined. Regardless of the approach used, the module 144 transmits the descriptor/feature vector to the classification module 146.

With continued reference to FIG. 1, captured image data 150 may undergo processing by the violation determination device 106 and a classification 152 and/or evidence package 154 may be displayed to the user in a suitable form on the GUI 140 in communication with the determination device 106. The GUI 140 can include a display, for displaying information to users, and a user input device, such as a keyboard or touch or writable screen, for receiving instructions as input, and/or a cursor control device, such as a mouse, trackball, or the like, for communicating user input information and command selections to the processor 134.

In another embodiment, the information output from the determination device 106 can be provided to a user device 108, such as a computer belonging to an enforcement authority. The user device 108 can include a computer at a dispatch center, a smart phone belonging to an enforcement driver in transit (and capable of making traffic stops) or to a vehicle computer and/or GPS system that is in communication with the determination device 106.

Figure 2:
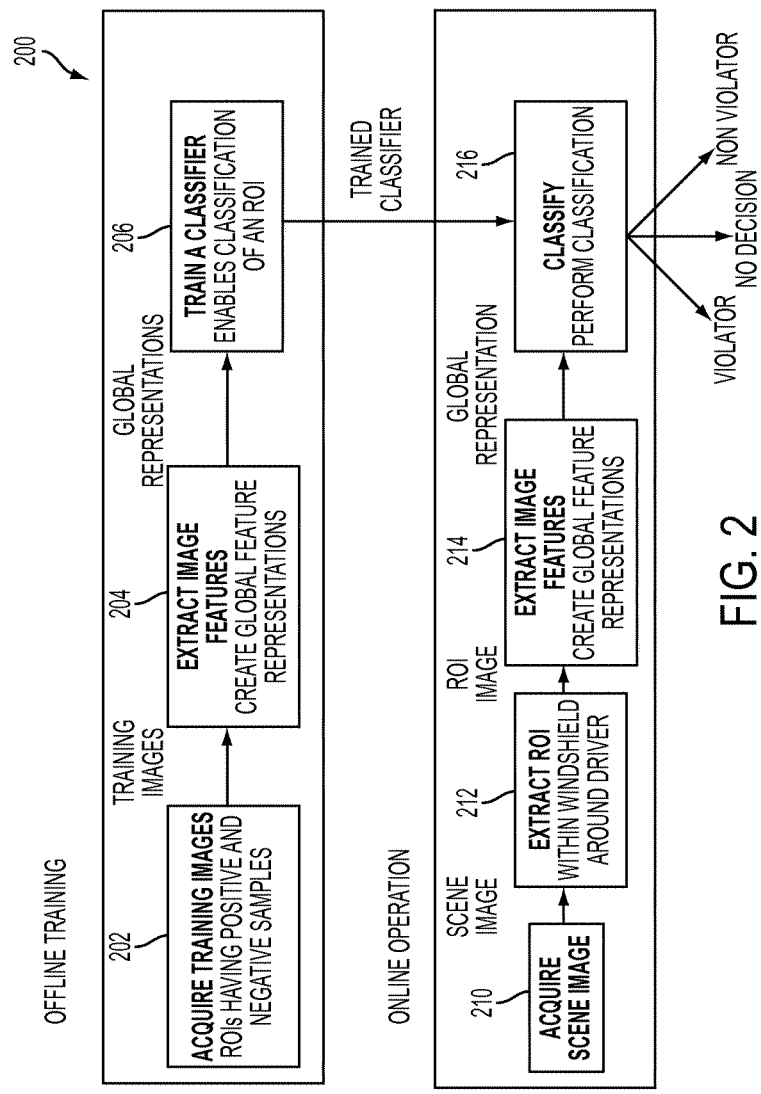
FIG. 2 is a flow chart illustrating an exemplary method in accordance with the present disclosure.

Turning now to FIG. 2, an exemplary method in accordance with the present disclosure is illustrated and identified generally by reference numeral 200. It will be appreciated that the method 200 can be carried out by the previously described system 100, or other suitable system. The method 200 generally comprises a training portion and an operation portion. That is, the method trains a classifier using positive and negative sample images in the training mode, and then utilizes the trained classifier to classify acquired images in the operation mode.

The training portion of the method 200 begins with process step 202 wherein training images are acquired. This can include acquiring images that contain a view of a windshield and a driver of a vehicle. Training images can be selected to provide a wide variety of both positive and negative samples. For example, positive image samples can include images with drivers holding electronic devices in different ways such as left/right of the face. Negative image samples can include images with drivers not holding an electronic device, and also images with drivers holding other types of objects besides an electronic device (e.g., coffee mugs) in different ways. Typically, an imaging system positioned at road-side or on a gantry would be used to capture images/videos in the near-infrared (NIR) band (~800~1000 nm) through the windshield of an incoming vehicle. Other wavelength bands or RGB images could be used, but it has been found that monochrome images are sufficient for achieving high accuracy, and the NIR band makes the image acquisition covert.

In training scenarios, more sample images usually result in higher classification accuracy, but practical limits are often faced, such as the number of images that can be acquired or the amount of computation and time that can be committed to training. One method to decide on a suitable number of training images is to perform cross validations on an image set. For example, the classifier can train on 90% of the images and test on the other 10% across all combinations of 90% and 10%. If the accuracy varies significantly across combinations, more or improved training samples may be needed. Improvements can include lighting, camera angles, ROI, features, etc.

Figure 3A:
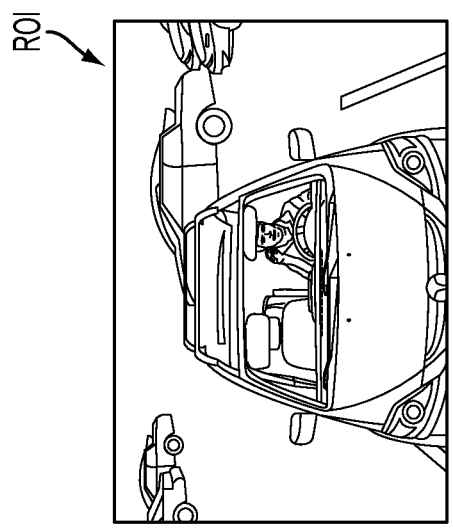
FIG. 3A and 3B are two examples of captured images.
Figure 3B:
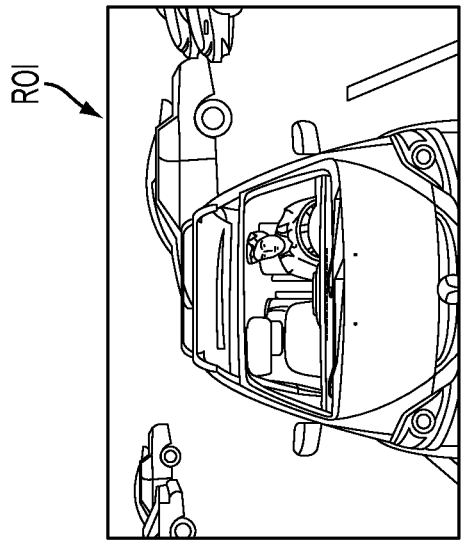
Figure 4A:
FIG. 4A is an image wherein the windshield region has been identified as the region of interest.
Figure 4B:
FIG. 4B is an image wherein the driver's side of the windshield has been identified as the region of interest.

For example, in FIGS. 3A and 3B, two examples of captured images I in a scene are shown. There are many advantages to focus on an ROI on a localized area. For example, in FIG. 4A the windshield is cropped as the ROI, while in FIG. 4B the driver's side of the windshield is cropped as the ROI. In addition to substantial computational cost and time savings, for a machine-learning-based approach, using a defined ROI for further processing, the classifier focuses on the relevant differentiating characteristics between violators and non-violators (e.g., driver with a mobile phone vs. driver without a phone) and not on extraneous features outside of the ROI in order to achieve better classification accuracy.

Figure 5:
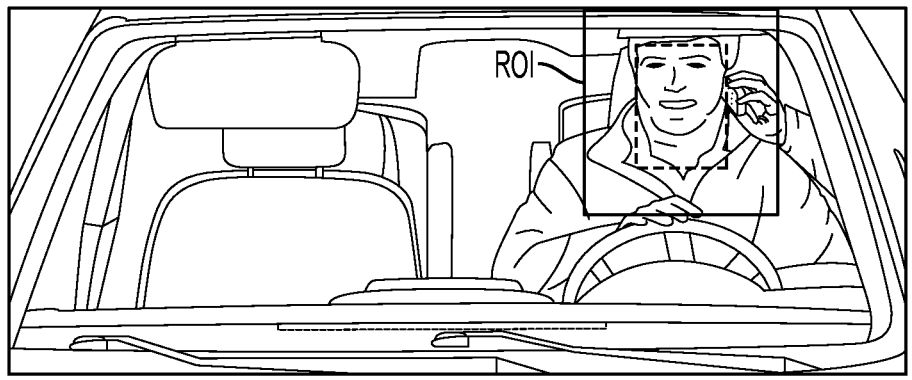
FIG. 5 is an image wherein the area around the driver's head has been identified as the region of interest.

Additional optimization may include cropping the area around the driver in a particular way to minimize extraneous features. For instance, in some configurations it can be advantagous to define an ROI around the driver's face as shown in FIG. 5 (the area between the inner box and the outer box) instead of the entire driver's side of the windshield, as most drivers will hold mobile phones close to their face when they talk. This optimization can include an additional face detection step in the process.

Once the images are acquired in process step 202, image features are extracted from each of the training images to create global feature representations.

The present disclosure uses a global feature representation rather than an approach that searches for specific image content (e.g., hands, a mobile phone, etc). As noted, past approaches that include searching for specific content within an image have a number of deficiencies. For example, these approaches are based on the assumption that the objects are visible to the camera. Therefore, parts of the image are analyzed to determine a location of the objects and appearance characteristics, such as color, size, texture, and shape, etc., or even the spectral characteristic, which can be extracted for detecting pixels belonging to the skin of a driver. The objects in the image that have characteristics (color, texture, spectral) matching a reference object are associated as being the same as the reference object. In other words, the object is labeled as phone or hand. One problem associated with conventional object detection is that variations in the captured image can result in incorrect classifications. For example, some drivers may hold a device in a different or awkward position that makes detection of the object difficult or impossible. Another drawback when using a spectral approach is that, to determine if two spectra are similar to each other, multiple sample points in the spectral range are needed, which generally requires a much more expensive multi- or hyper-spectral camera.

The present disclosure sets forth a method that can classify an ROI instead of looking for specific objects situated inside parts of the image. More specifically, the approach of the present disclosure makes no assumptions about the content of images in advance of the process. Accordingly, the present disclosure sets forth a feature extraction method that is adapted to process pixels of the image for determining a descriptor of the image. A feature representation can include one or more of include a Successive Mean Quantization Transform (SMQT), a Scale-Invariant Feature Transform (SIFT), a Histogram of Gradients (HOG), a Bag-of-Visual-Words Representation, a Fisher Vector (FV) Representation, or a combination thereof, for example.

In process step 206, the classifier is trained. In one example, a classifier such as SVM (Support Vector Machine) is trained with the set of labeled training images (w/ and w/o electronic device) phone). The classifier is adapted to determine a distance of the 2 classes (w/ and w/o electronic device) to a hyperplane. The classifier is further adapted to determine whether the distance meets a threshold.

Once the classifier is trained in process step 206, the method proceeds to the operational mode where new images are acquired, processed, and classified. It will be appreciated that many steps of the operational mode are similar to the training mode and, as such, the following discussion focuses on the additional features and/or differences of the operational mode.

In process step 210, a scene image is acquired. This can be done with a roadside camera in the manner described above in connection with process step 202. In process step 212, the ROI is extracted from the acquired image. In general, the same automated process for identifying/extracting the ROI can be used in both the training and operational modes. However, it should be appreciated that in the training mode, the ROI in some cases can be identified manually. In the operational mode, however, the ROI extraction would be performed in a manner compatible with automatic operation.

In process step 214, image features are extracted from the ROI and a global representation is created, and then, in process step 216, the classifier classifies the ROI. As will be appreciated, the classifier classifies the ROI in response to the location and distance of the feature representation (e.g., Fisher Vector) to the hyperplane determined in the training stage. Thresholds on distance can be used to output a definitive decision or non-decision, or a distance may be used to provide a degree of confidence. Notification of the classification can be provided in one or more ways. For example, a graphical user interface can be adapted to output the classification result to a law enforcement officer or back office operator that takes the appropriate action.

In experiments, a trained SVM classifier was used to process a test set of images. In one example, a set of 104 images (52 positives and 52 negatives) were taken at a parking lot with drivers holding a mobile phone in different positions. The set of images was randomly split into two even groups, one for training and one for testing. The method was run three times randomly selecting the positive and negative image sets. The classification results were averaged from the 3 rounds. Two false positives were generated (e.g., no phone usage by a driver is misclassified as usage) and 2 false negatives were generated (e.g., mobile phone usage is misclassified as nonusage). However, classification accuracy has exceeded 95%.

It will be appreciated that the accuracy requirement will be at least in part dependent on the final application. For example, if positive (violator) ROI's will be reviewed by a human operator, the process doesn't have to be 100% accurate. Even in the case of automatic detection (no review by human), the accuracy can be biased toward the number false negatives to reduce the number of false positives.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for detecting electronic device use by a driver of a vehicle, the method comprising:
   acquiring a monochrome NIR image including a vehicle from an associated image capture device positioned to view oncoming traffic;
   locating a region of the vehicle in the monochrome NIR image;
   processing pixels of the located region of the monochrome NIR image for computing a feature vector describing a windshield region of the vehicle;
   applying the feature vector to a classifier for classifying the monochrome NIR image into respective classes including at least classes for candidate electronic device use and candidate electronic device non-use; and,
   outputting the classification;
   wherein processing the image includes generating a global descriptor describing the entire image using a process selected from a group consisting of:
   a Successive Mean Quantization Transform (SMQT);
   a Scale-Invariant Feature Transform (SIFT);
   a Histogram of Gradients (HOG);
   a Bag-of-Visual-Words Representation;
   a Fisher Vector(FV) Representation: and,
   a combination of the above;
   wherein the SMQT process includes determining a feature vector for each pixel in the image by analyzing adjacent pixels in the region of the pixel, wherein for each pixel, the pixel is designated as a center pixel in a region of adjacent pixels, an average value for the pixels in the region is determined, the average value is set as a threshold value, the value of each pixel in the region is compared to the threshold, each pixel in the region is assigned a binary value based on the comparison, and a binary number is generated for the region.

2. The method of claim 1 wherein processing the pixels of the located region include extracting the windshield region from the monochrome NIR image, and wherein classifying the monochrome NIR image is performed without searching the windshield region for specific image content.

3. The method of claim 2, further comprising defining a passenger side and a driver side within the windshield region, and extracting the driver side of the windshield region from the windshield region.

4. The method of claim 1 further comprising, before acquiring the monochrome NIR image, training a classifier using at least a first sample image including a driver holding an electronic device and at least a second sample image including a driver not holding an electronic device.

5. The method of claim 1 further comprising, in response to the vehicle being classified as a candidate electronic device user, performing further processing on the monochrome NIR image for determining whether the vehicle is a violator or non-violator.

6. The method of claim 5, wherein the further processing on the monochrome MIR image includes detecting a unique vehicle identifier associated with the vehicle in the monochrome NIR image, and comparing the unique vehicle identifier to a list of authorized vehicle identifiers to determine whether the vehicle is a violator or non-violater.

7. The method of claim 1, wherein the outputting further includes:

providing notice of a candidate violator to an associated user device for further review.

8. A system configured to perform image analysis for detecting electronic device use by a driver of a vehicle comprising:
   a non-multispectral image capture device operably connected to a data processing device that captures a monochrome NIR image of a target vehicle; and
   a processor-usable medium embodying computer code, said processor-usable medium being coupled to said data processing device, said computer program code comprising instructions executable by sad processor and configured for:
   locating a windshield region of the vehicle in the captured image; processing pixels of the windshield region of the image for computing a feature vector describing the windshield region of the vehicle, the feature vector defining a set of generic features that describe the entire windshield region;
   applying the feature vector to a classifier for classifying the image into respective classes including at least classes for candidate electronic device use and candidate electronic device non-use; and, outputting the classification;
   wherein processing the pixels of the windshield region includes generating a global descriptor describing the entire image using a process selected from a group consisting of:
   a Successive Mean Quantization Transform (SMQT);
   a Scale-Invariant Feature Transform (SIFT):
   a Histogram of Gradients (HOG);
   a Bag-of-Visual-Words Representation;
   a Fisher Vector (FV) Representation; and,
   a combination of the above;
   wherein the SMQT process includes determining a feature vector for each pixel in the image by analyzing adjacent pixels in the region of the pixel, wherein for each pixel, the pixel is designated as a center pixel in a region of adjacent pixels, an average value for the pixels in the region is determined, the average value is set as a threshold value, the value of each pixel in the region is compared to the threshold, each pixel in the region is assigned a binary value based on the comparison, and a binary number is generated for the region.

9. A system as set forth in claim 8, wherein said computer program code comprising instructions executable by said processor is further configured for, after locating a windshield region of the vehicle in the captured image, extracting the windshield region from the image, and wherein classifying the image is performed without searching the windshield region for specific image content.

10. The method of claim 9, wherein said computer program code comprising instructions executable by said processor is further configured for defining a passenger side and a driver side within the windshield region, and extracting the passenger side of the windshield region from the windshield region.

11. The method of claim 8 wherein said computer program code comprising instructions executable by said processor is further configured for, prior to acquiring the image with the image capture device, training a classifier using at least a first sample image including a driver holding an electronic device and at least a second sample image including a driver not holding an electronic device.

12. The method of claim 8, wherein said computer program code comprising instructions executable by said processor is further configured for, in response to the vehicle being classified as a candidate electronic device user, performing further processing on the image for determining whether the vehicle is a violator or non-violator.

13. The method of claim 12, wherein the further processing on the image includes detecting a unique vehicle identifier associated with the vehicle in the associated image, and comparing the unique vehicle identifier to a list of authorized vehicle identifiers to determine whether the vehicle is a violater or non-violater.

14. The method of claim 8, wherein the outputting further includes providing notice of a candidate violator to an associated user device for further review.

15. A non-transitory computer-usable medium for performing image analysis for detecting electronic device use by a driver of a vehicle said computer-usable medium embodying a computer program code, said computer program code comprising computer executable instructions configured for:
   acquiring a monochrome NIR image including a vehicle from an associated image capture device positioned to view oncoming traffic;
   locating a windshield region of the vehicle in the captured image; processing pixels of the windshield region of the image for computing a feature vector describing the windshield region of the vehicle, the feature vector defining a set of generic features that describe the entire windshield region without searching for specific image content within the windshield region;
   applying the feature vector to a classifier for classifying the image into respective classes including at least classes for candidate electronic device use and candidate electronic device non-use; and,
   outputting the classification;
   wherein processing the pixels of the windshield region includes generating a global descriptor describing the entire image using a process selected from a group consisting of:
   a Successive Mean Quantization Transform (SMQT);
   a Scale-Invariant Feature Transform (SIFT);
   a Histogram of Gradients (HOG);
   a Bag-of-Visual-Words Representation;
   a Fisher Vector (FV) Representation; and,
   a combination of the above;
   wherein the SMQT process includes determining a feature vector for each pixel in the image by analyzing adjacent pixels in the pixel, wherein for each pixel, the pixel is designated as a center region of adjacent pixels, an average value for the pixels in the region is determined, the average value is set as a threshold value, the value of each pixel in the region is compared to the threshold, each pixel in the region is assigned a binary value based on the comparison, and a binary number is generated for the region.

16. The non-transitory computer-usable medium of claim 15, the instructions further comprising, after locating a windshield region of the vehicle in the captured image, extracting the windshield region from the image.

17. The non-transitory computer-usable medium of claim 16, the instructions further comprising defining a passenger side and a driver side within the windshield region, and extracting the passenger side of the windshield region from the windshield region.

* * * * *